Oct. 16, 1962  S. H. PERLMAN  3,059,087
INFRARED OVEN
Filed April 28, 1960  2 Sheets-Sheet 1

INVENTOR.
SIDNEY H. PERLMAN
BY Arthur H. Seidel
ATTORNEY

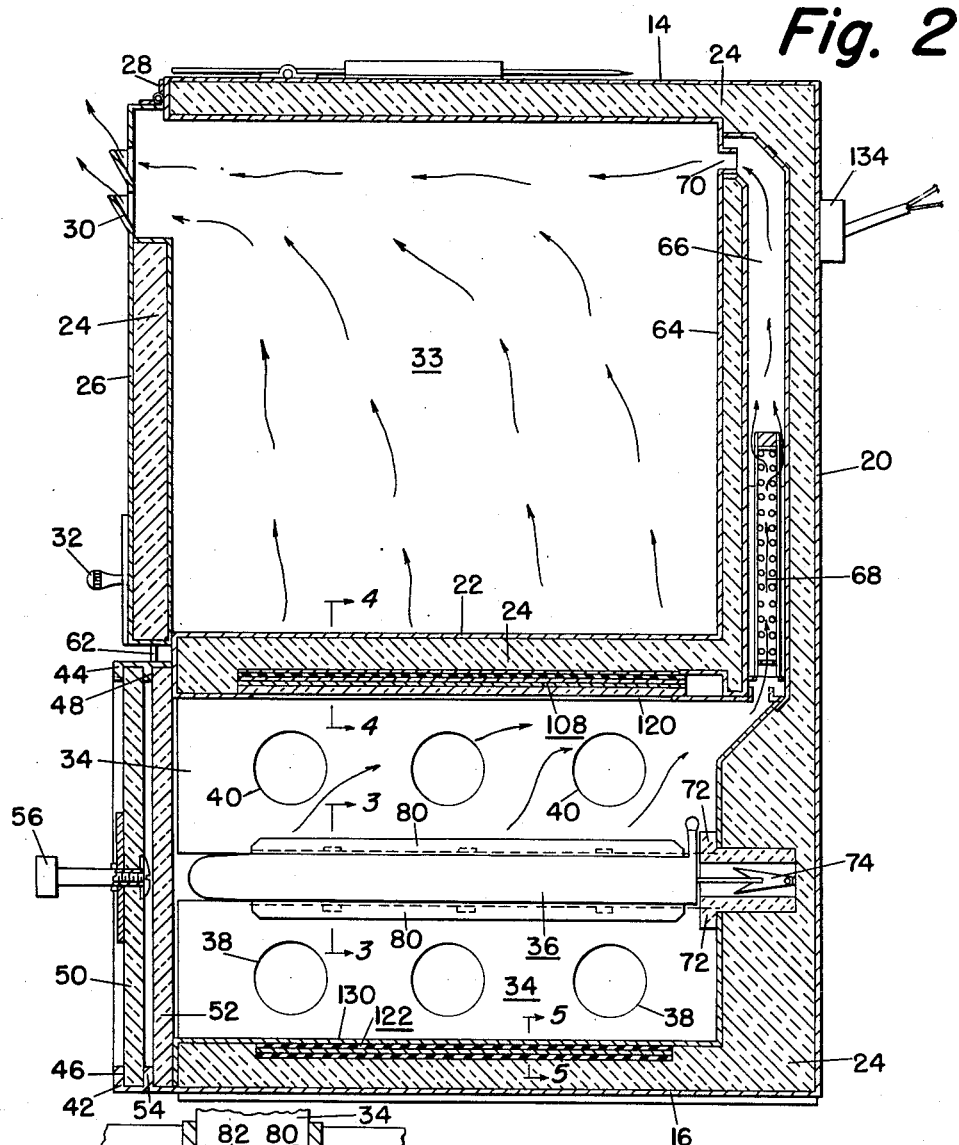

United States Patent Office 3,059,087
Patented Oct. 16, 1962

3,059,087
INFRARED OVEN
Sidney H. Perlman, Riverton, N.J., assignor to Temperature Engineering Corporation, Riverton, N.J., a corporation of New Jersey
Filed Apr. 28, 1960, Ser. No. 25,305
10 Claims. (Cl. 219—35)

This invention relates to an oven, and more particularly, to an infrared oven having a storage area integral therewith.

Infrared ovens have been found to be superior to other types in certain specialized fields. Infrared ovens are provided with a nonincandescent body which emits rays lying beyond the red end of the visible spectrum. The wavelengths of infrared waves are longer than those of visible light and shorter than those of radio waves. The strong absorption of infrared by many substances renders it useful for applying heat energy in baking or cooking.

It is often desirable, especially in aircraft, to provide a storage space integral with the oven so as to provide a warming chamber. The warming chamber may be utilized prior to cooking of the food or for keeping the food warm after it has been cooked. If food is placed in the warming chamber prior to being cooked, and the oven is of the infrared type, the length of time required to cook any specific food will be drastically reduced.

It is an object of this invention to provide a novel infrared cooking oven.

It is another object of this invention to provide a novel infrared cooking oven having a storage space integral therewith.

It is a further object of this invention to provide a novel infrared cooking oven having a catalyst for removing any odors or smoke in the heat waves.

It is a still further object of this invention to provide a novel infrared cooking oven which is pleasing in appearance and provides for the maximum amount of cooking area.

It is an even further object of this invention to provide a novel infrared cooking oven wherein food may be cooked by infrared rays and heated by a hot plate at the same time.

It is a still further object of this invention to provide an infrared cooking oven which cooks food in the minimum amount of time.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is a cross-sectional view of the cooking oven of the present invention.

FIGURE 3 is a cross-sectional view taken along the lines 3—3 of FIGURE 2.

FIGURE 5 is a cross-sectional view taken along the lines 5—5 in FIGURE 2.

Referring to the drawing in detail, wherein like numerals indicate like elements, there is shown in FIGURE 1 a cooking oven designated generally as 10.

Figure 1:
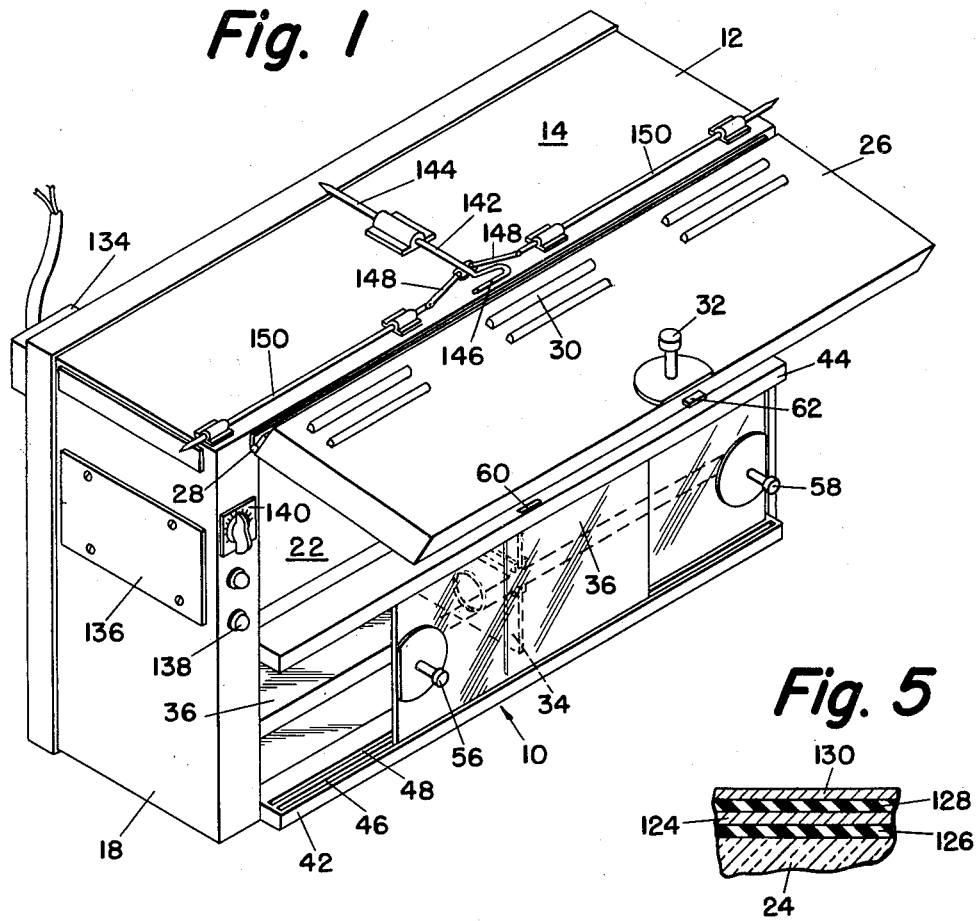
FIGURE 1 is a perspective view of the cooking oven of the present invention.

The cooking oven 10 comprises a housing 12. The housing 12 comprises a top wall 14, a bottom wall 16, a pair of end walls 18, a back wall 20, and a center wall 22. The walls 14 through 22 are each of double thickness with a layer of insulation 24 between the thicknesses of each wall. A door 26 is pivotally secured to the housing 12 by hinge 28.

As shown more clearly in FIGURE 2, the door 26 does not have a double thickness extending its full height. At the top portion of the door 26, where the door 26 does not have a double thickness, there is provided a plurality of louvers 30. A handle 32 is fixedly secured to the door 26 for assisting in the pivotable movement of the door. The top wall 14, the back wall 20, the center wall 22, and the end walls 18 cooperate with the door 26 to define a warming chamber 33 which extends the full length of the housing 12.

The center wall 22 extends the full length of the housing 12 so that a warming chamber 33 is provided above the center wall 22 and a cooking chamber is provided below the center wall 22. The cooking chamber is separated by a dividing wall 34. The dividing wall 34 extends from the back wall 20 to the front of the housing 12 as shown more clearly in FIGURE 2. Thus, the dividing wall 34 divides the cooking chamber into two separate chambers. Each of the separate chambers, there is provided a horizontally disposed shelf 36. The shelf 36 extends from the back wall 20 to a point spaced inwardly from the front of the housing 12 as shown more clearly in FIGURE 2. The dividing wall 34 is preferably provided with a plurality of holes 38 and 40 disposed above and below the shelves 36 so as to provide cross ventilation.

The housing 12 is provided on its front surface with spaced guide members 42 and 44. The guide members 42 and 44 extend substantially the full length of the housing 12 and are provided with spaced tracks 46 and 48. A sliding glass door 50 is disposed in track 46. A sliding glass door 52 is disposed in track 48. Inwardly directed flanges 54 on the guide members 42 and 44 maintain the glass doors 50 and 52 in spaced relation.

The sliding glass door 50 is provided with a handle 56. As shown more clearly in FIGURE 2, the handle 56 has been broken away to show that it is tubular and cooperates with a screw on the opposite side of the glass door 50. The handle 58 is identical with the handle 56. The handles 56 and 58 provide a means for reciprocably moving the doors 50 and 52 in their respective tracks. The door 50 is identical with the door 52, each of the doors 50 and 52 having a length substantially equal to one-half of the length of the tracks 46 and 48. Thus, food placed on shelf 36 to one side of the dividing wall 34 is accessible by moving door 50. Food placed on shelf 36 on the other side of dividing wall 34 is accessible by movement of door 52. The uppermost surface of the guide member 34 is provided with a slot 60 which cooperates with the latch 62 to secure the door 26 in its closed disposition.

An intermediate wall 64 is provided at the rear of the warming chamber 33. Wall 64 is preferably integral with the center wall 22. Intermediate wall 64 cooperates with the back wall 20 to define a space 66 which extends for a short distance to either side of the dividing wall 34. The space 66 is in communication with the cooking chamber on each side of the dividing wall 34 and is provided with a Houdry catalyst 68. The Houdry catalyst 68 is commercially available and is of the type which chemically withdraws odors and smoke from the heat waves. The space 66 is in communication at its uppermost end with the warming chamber 33 by a passageway 70. Therefore, heat waves generated in the cooking chamber may pass up through the Houdry catalyst 68, through the passageway 70, into the warming chamber 33 and out through the louvers 30 to the surrounding atmosphere. Since the Houdry catalyst 68 withdraws odors and smoke from the heat waves, the heat waves pass out through the louvers 30 will not be objectionable by giving an indication that food is being prepared. Thus, the oven 10 may be disposed in a location adjacent to personnel and will not interfere with the activities of said personnel. For example, the oven may be disposed in an airplane, and it will not give any indication to the passengers on the airplane that food is being prepared since there are no odors or smoke emitting from the oven.

The shelves 36 are supported in the cooking chamber between mounts 72. Intermediate the mounts 72 there is provided an electrical jack 74. The shelf 36, as shown more clearly in FIGURE 3, comprises a pair of spaced metal plates 76 and 78 joined together at their end adjacent the front of the housing 12. A channel member 80 is provided on the uppermost surface of plate 76 and is secured thereto by rivet 82. The channel member 80 provides a track support for the dividing wall 34. A channel member 84 having outwardly directed flanges 86 is secured to plate 78 by a screw 88. The channel member 80 is secured to the lowermost surface of the plate 78 by the screw 88.

A quartz filter plate 90 is disposed between the outwardly directed flanges 86 and the plate 78. An opening 92 is provided in the plate 78 beneath the quartz filter plate 90. The shelf 36 is provided with a plurality of quartz filter plates 90 and an opening 92 for each quartz filter plate 90. A heater plate 94 is operatively secured to the jack 74 and is disposed on the outwardly directed flanges 86 so as to define a space 96 between the plate 94 and the quartz filter plate 90. A sheet of mica 98 is disposed above the heater plate 94. A polished chrome steel reflector plate 100 is disposed above the sheet of mica 98. A second sheet of mica 102 is disposed above the reflector plate 100. A second heater plate 104 is disposed above the sheet of mica 102 and is operatively connected by leads not shown with the heater plate 94. A sheet of mica 106 is disposed above the heater plate 104.

When the oven 10 is supplied with electricity, the heater plate 94 will generate heat waves which will be directed upwardly and downwardly. The quartz filter plates 90 will filter out all waves except infrared waves. The heat directed upwardly will bounce off the reflector plate 100 and pass down through the quartz filter plates 90. Thus, food disposed below the shelves 36 will be cooked by infrared rays including reflected infrared rays. The heater plate 104 serves as a hot plate so as to maintain the plate 76 warm. The plate 76 transmits its heat to the container in which the food is placed by conduction much in the same manner as a hot plate.

Figure 4:
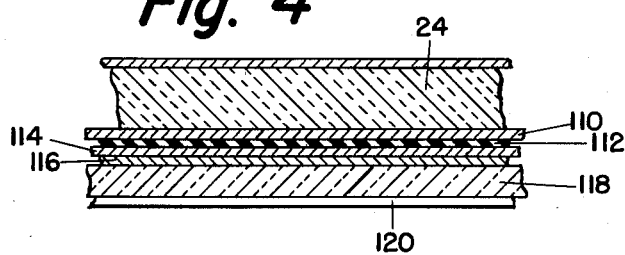
FIGURE 4 is a cross-sectional view taken along the lines 4—4 in FIGURE 2.

As seen more clearly in FIGURE 4, the infrared cooking means 108 located in the center wall 22 is similar to the infrared cooking means in the shelf 36. The infrared cooking means 108 comprises a reflector plate 110, a sheet of mica 112 below the reflector plate 110, a heater plate 114 below the sheet of mica 112, a metal plate 116, and a quartz filter plate 118. The reflector plate 110 is identical with the reflector plate 100. An opening 120 is provided in the lowermost surface of the center wall 22 so that the infrared rays passing through the quartz filter plate 118 may cook food placed on the plate 76. At the same time that food placed on the plate 76 is being cooked by the infrared cooking means 108, the container for the food is being heated by conduction of heat from the heater plate 104.

As seen more clearly in FIGURE 5, the bottom wall 16 is provided with a hot plate 122. The hot plate 122 comprises a heater plate 124 having sheets of mica 126 and 128 disposed on opposite sides thereof. The uppermost wall 130 of the bottom wall 16 is disposed on the uppermost surface of the sheet of mica 128. Thus, while the food is being cooked by the infrared rays passing through the quartz filter plates 90, the container for the food is being heated by conduction from the hot plate 122.

As junction box 134 is positioned on the rear wall 20 adjacent the left hand end wall 18. A panel 136 is removably secured to the end wall 18 so that the oven controls may be inspected and repaired. Control buttons 138 are positioned on the front wall of the housing 12. A control dial 140 is positioned above the control buttons 138. The control buttons 138 are provided for starting or stopping the heating of the cooking means. The control dial 140 enables the operator to select the desired temperature at which the food is to be cooked. Each of the heater plates 94, 104, 114 and 124 are connected with wires, not shown, to the junction box 134 and the control apparatus located behind panel 136.

A mounting means 142 is disposed on the uppermost surface of top wall 14. The mounting means 142 comprises a rod 144 having a hook 146 at its end adjacent the front wall of the housing 12. The rod 144 is operatively connected to the arms 150 by toggle links 148. Movement of the rod 144 towards and away from the back wall 20 causes the arms 150 to move toward and away from the rod 144. The ends of the arms 150 are intended to be inserted into cooperating holes on a wall.

The oven will be utilized in the following manner: The control buttons 138 will be manipulated to turn the oven to an on position. The dial 140 will be manipulated so as to select the proper temperature. For example, when the heater plates in the cooking chamber are supplied with 3,400 watts, the cooking chamber may have a temperature of approximately 700° F. while the warming chamber 33 will be maintained at a temperature of approximately 150° F. If desired, the intermediate wall 64 may be provided with heating elements so as to vary the temperature in the warming chamber 33.

The warming chamber 33 is preferably of sufficient size so as to accommodate thirty-six pieces of frozen food which are preferably of the type having aluminum containers. Approximately three articles of frozen food will be placed on the shelves 36 on each side of the dividing wall 34. Another three articles of frozen food may be placed on the wall 130 on each side of the dividing wall 34. It is contemplated that the food in the cooking chamber will be cooked and ready to serve in approximately twelve minutes. While the food is being cooked by infrared rays directed at the food from above, the containers for the food are being heated by conduction from the hot plates beneath the containers. The heat generated in the cooking chamber passes up through the space 66 and the odors and smoke are removed by the Houdry catalyst 68. The heat then passes into the warming chamber 33 and then passes out through the louvers 30. While food is being cooked in the cooking chamber, the food in the warming chamber 33 is being heated to some extent. The heating of the food in warming chamber 33 prior to being cooked in the cooking chamber, reduces the amount of time that the food must be left in the oven 10.

Since a warming chamber has been provided for storing the food prior to being cooked, and since the food is being cooked with infrared rays at the same time that the food container is being heated by a hot plate from below, the amount of time required for cooking has been reduced to a minimum. When the food in the cooking chamber is ready to be served, the doors 50 and 52 are slid to an open disposition and the food is removed from the cooking chamber. When food has been removed from the cooking chamber, it is replaced by food from the warming chamber 33. Thus, the food is passed through a warming and cooking cycle.

The oven 10 is preferably made from a light weight material such as aluminum. By making the oven 10 from aluminum, the weight of the oven can be drastically reduced and the oven is not subject to corrosion and maintains a pleasing appearance.

The transparent glass doors 50 and 52 enable an operator to watch the food as it is being cooked so as to determine the correct time at which the food should be removed. If desired, a timing mechanism may be provided so as to emit an audible signal when the food has been cooked and is ready to be served. If the oven 10 is utilized in an airplane, members may be provided to prevent the articles of food being cooked from sliding sideways as the airplane changes its course of flight. If desired, racks may be provided in the warming chamber 33 for supporting the food stored therein.

The present invention may be embodied in other specific forms without departing from the spirit or essential attributes thereof and, accordingly, reference should be made to the appended claims, rather than to the foregoing specification as indicating the scope of the invention.

I claim:

1. An oven comprising a housing having a warming chamber therein, a cooking chamber in said housing below said warming chamber, a passageway in said housing providing communication between said cooking chamber and said warming chamber, a catalyst means in said passageway for removing food odors, a door on said housing providing access to said warming chamber, a door on said housing providing access to said cooking chamber, and infrared cooking means in said cooking chamber, and a hot plate in said cooking chamber below and spaced from said infrared cooking means, thereby providing a space in which food may be cooked by infrared rays while a container for the food is heated by conduction.

2. An oven as set forth in claim 1 wherein said infrared cooking means includes a reflector plate, a heater plate below said reflector plate and an infrared filter below said heater plate.

3. In an oven as set forth in claim 1 wherein the door on said housing providing access to said warming chamber is pivotably secured to said housing, and the door providing access to said cooking chamber is transparent and slidable in a track horizontally disposed along a front wall of said housing.

4. In an oven comprising a housing having a cooking chamber, a horizontally disposed shelf in said cooking chamber, a first infrared cooking means in said chamber above said shelf, a first hot plate in the top surface of said shelf, a second infrared cooking means in the bottom surface of said shelf, a second hot plate in said chamber below said shelf, said shelf being spaced from said first infrared cooking means and said second hot plate so that food may be cooked between said shelf and said first infrared cooking means and between said shelf and said second hot plate, a warming chamber in said housing above said cooking, a passageway in said housing providing communication between said chambers, and a means in said passageway for removing odors from the heat passing to said warming chamber through said passageway from said cooking chamber.

5. In an oven as set forth in claim 4, including slidable transparent glass doors providing access to said cooking chamber, and a pivotable door providing access to said warming chamber.

6. In an oven comprising a housing having a cooking chamber, a horizontally disposed shelf in said cooking chamber, a first infrared cooking means in said chamber above said shelf, a first hot plate in the top surface of said shelf, a second infrared cooking means in the bottom surface of said shelf, a second hot plate in said chamber below said shelf, the chamber above said shelf and the chamber below said shelf being in thermal communication, said shelf being spaced from said first infrared cooking means and said second hot plate so that food may be cooked between said shelf and said first infrared cooking means and between said shelf and said second hot plate, channel members on the upper and lower surface of said shelf, said channel members providing a track support for a dividing wall in said cooking chamber.

7. An oven comprising an insulated housing, a center wall separating said housing into a warming chamber and a cooking chamber, a passageway in said housing enabling heat to pass from said cooking chamber to said warming chamber, a shelf extending from the back wall of said housing, said shelf being spaced from and substantially parallel to said center wall and the bottom wall of said housing so as to define two cooking areas, each cooking area including means for cooking food by infrared rays, a door on said housing providing access to said cooking chamber, and a door on said housing providing access to said warming chamber.

8. An oven as set forth in claim 7 wherein the means for cooking food is adjacent the top of each cooking area and a heater is positioned adjacent the bottom of each cooking area so that food may be cooked by infrared rays while the food container is heated by said heaters.

9. An oven as set forth in claim 8 including a catalyst means in said passageway for removing food odors and a vent in the door to said warming chamber providing communication between said warming chamber and the atmosphere.

10. In an oven comprising a housing having a cooking chamber, a horizontally disposed shelf in said cooking chamber, a first infrared cooking means in said chamber above said shelf for directing infrared rays toward said shelf, a first hot plate in the top surface of said shelf, a second infrared cooking means in the bottom surface of said shelf, a discrete heater member adapted to be connected to a source of electrical potential in said shelf for each of said first hot plate and second infrared cooking means, a second hot plate in said chamber below said shelf, said second infrared cooking means including an infrared filter and a reflector plate for reflecting heat rays through said infrared filter toward said second hot plate, said shelf being spaced from said first infrared cooking means and said hot plate so that food may be cooked between said shelf and said first infrared cooking means and between said shelf and said second hot plate, with the space above said shelf being in thermal communication with the space below said shelf.

References Cited in the file of this patent

UNITED STATES PATENTS

| | | |
|---|---|---|
| 1,183,926 | Waters | May 23, 1916 |
| 1,208,637 | Phelps | Dec. 12, 1916 |
| 1,213,595 | Deal | Jan. 23, 1917 |
| 2,063,407 | Smith | Dec. 8, 1936 |
| 2,625,928 | Gould | Jan. 20, 1953 |
| 2,729,735 | Fries | Jan. 3, 1956 |

FOREIGN PATENTS

| | | |
|---|---|---|
| 564,853 | France | Oct. 30, 1923 |
| 631,197 | Great Britain | Oct. 28, 1949 |
| 69,149 | France | Apr. 28, 1958 |